(12) United States Patent
Shimizu et al.

(10) Patent No.: US 9,778,420 B2
(45) Date of Patent: Oct. 3, 2017

(54) CONNECTING STRUCTURE OF OPTICAL MODULE AND OPTICAL CONNECTOR

(71) Applicant: NEC Corporation, Minato-ku, Tokyo (JP)

(72) Inventors: Takanori Shimizu, Tokyo (JP); Ichiro Ogura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 10 days.

(21) Appl. No.: 14/423,590

(22) PCT Filed: Aug. 19, 2013

(86) PCT No.: PCT/JP2013/072068
§ 371 (c)(1),
(2) Date: Feb. 24, 2015

(87) PCT Pub. No.: WO2014/034458
PCT Pub. Date: Mar. 6, 2014

(65) Prior Publication Data
US 2015/0286008 A1 Oct. 8, 2015

(30) Foreign Application Priority Data

Aug. 31, 2012 (JP) ................................. 2012-191647

(51) Int. Cl.
*G02B 6/34* (2006.01)
*G02B 6/42* (2006.01)
(Continued)

(52) U.S. Cl.
CPC ............... *G02B 6/34* (2013.01); *G02B 6/124* (2013.01); *G02B 6/12004* (2013.01);
(Continued)

(58) Field of Classification Search
None
See application file for complete search history.

(56) References Cited

U.S. PATENT DOCUMENTS 5,420,947 A * 5/1995 Li ........................... G02B 6/34
359/569
7,283,695 B2 * 10/2007 Gaylord ............. G02B 6/02085
385/14
(Continued)

FOREIGN PATENT DOCUMENTS

JP 62-239113 A 10/1987
JP 04-088305 A 3/1992
(Continued)

OTHER PUBLICATIONS

International Search Report for PCT Application No. PCT/JP2013/072068, mailed on Oct. 1, 2013.
(Continued)

*Primary Examiner* — Tina Wong

(57) ABSTRACT

To make connection work be done easily and certainly, and, further, space-saving be achieved, when an optical fiber and an optical module are connected. An optical module includes a connecting face connected with an optical connector and a first diffraction grating, provided in an end part of a first optical waveguide, to convert an optical axis direction of the first optical waveguide to a direction toward an opposing face of the optical connector; in the optical connector, the second optical waveguide is provided in the optical connector along the opposing face toward the connecting face; the optical connector includes a second diffraction grating, provided in an end part of the second optical waveguide, to convert an optical axis direction of the second optical waveguide into a direction toward the optical module; and while the optical module and the optical connector are connected mechanically to make the opposing face of the optical connector oppose the connecting face of the optical module, the first diffraction grating and the
(Continued)

second diffraction grating opposing each other and being coupled optically.

8 Claims, 4 Drawing Sheets

(51) Int. Cl.
    *G02B 6/122*    (2006.01)
    *G02B 6/124*    (2006.01)
    *G02B 6/125*    (2006.01)
    *G02B 6/12*     (2006.01)

(52) U.S. Cl.
    CPC .......... *G02B 6/125* (2013.01); *G02B 6/1228* (2013.01); *G02B 6/42* (2013.01); *G02B 6/423* (2013.01); *G02B 6/4214* (2013.01); *G02B 6/4242* (2013.01); *G02B 2006/12107* (2013.01)

(56) References Cited

U.S. PATENT DOCUMENTS

| | | | | |
|---|---|---|---|---|
| 8,267,583 B2* | 9/2012 | Yao | ............ | G02B 6/13 |
| | | | | 384/31 |
| 8,503,841 B2* | 8/2013 | Kopp | ............ | G02B 6/126 |
| | | | | 385/11 |
| 8,577,193 B2* | 11/2013 | Zhou | ............ | G02B 6/124 |
| | | | | 385/37 |
| 8,666,211 B2* | 3/2014 | Kopp | ............ | B82Y 20/00 |
| | | | | 385/130 |
| 8,855,452 B2* | 10/2014 | Andry | ............ | G02B 6/4204 |
| | | | | 385/33 |
| 2004/0114642 A1* | 6/2004 | Bullington | ........ | G02B 6/12004 |
| | | | | 372/6 |
| 2006/0067617 A1* | 3/2006 | Gaylord | ............ | G02B 6/02085 |
| | | | | 385/37 |
| 2007/0058685 A1* | 3/2007 | O'Daniel | ............ | H01S 5/1082 |
| | | | | 372/32 |
| 2009/0003762 A1* | 1/2009 | Chiniwalla | ........ | G02B 6/1228 |
| | | | | 385/14 |
| 2013/0121639 A1* | 5/2013 | Shimizu | ............ | G02B 6/12002 |
| | | | | 385/37 |
| 2014/0334781 A1* | 11/2014 | Fiorentino | ......... | G02B 6/3855 |
| | | | | 385/78 |
| 2015/0211960 A1* | 7/2015 | Shimizu | ............ | G02B 6/02057 |
| | | | | 356/73.1 |

FOREIGN PATENT DOCUMENTS

JP     2003-289153 A     10/2003
JP     2011-033696 A     2/2011

OTHER PUBLICATIONS

Kazuhiko Kurata, Institute of Electronics, Information and Communication Engineers, "Knouledge Base", group 9, edition 9, chapter 3, pp. 5-17, Feb. 16, 2011. Cited in Specification.

L. Zimmermann et al., "How to bring nanophotonics to application—silicon photonics packaging" IEEE Leos Newsletter, Dec. 2008 issue, pp. 4-14. Cited in Specification.

S. Bernabe et al., "Chip-to-chip optical interconnections between stacked self-aligned SOI photonic chips" Optics Express, vol. 20, No. 7, pp. 7886-7894, Mar. 2012. Cited in Specification.

T. Suhara et al., "Integrated Optics Components and Devices Using Periodic Structures", IEEE Journal of Quantum Electronics, vol. QE-22, No. 6, pp. 845-867, Jun. 1986 (Fig. 23). Cited in Specification.

* cited by examiner

CONNECTING STRUCTURE OF OPTICAL MODULE AND OPTICAL CONNECTOR

This application is a National Stage Entry of PCT/JP2013/072068 filed on Aug. 19, 2013, which claims priority from Japanese Patent Application 2012-191647 filed on Aug. 31, 2012, the contents of all of which are incorporated herein by reference, in their entirety.

TECHNICAL FIELD

The present invention relates to a connecting structure of an optical module and an optical connector.

BACKGROUND ART

Along with increase of a volume of data handled in a computer and the like, data transmission is being changed from data transmission using an electric signal to data transmission using a optical signal. For example, also among transceivers or other various kinds of devices and equipment and the like, there are ones which send and receive data (signals) to/from outside using a optical signal. When data transmission is performed using a optical signal, there is used a technology of silicon photonics with which an optical circuit to process a optical signal is formed as a silicon chip (hereinafter, it is referred to as an optical module accordingly) using a method to mount optical elements on a silicon substrate.

In such optical module, an optical waveguide such as an optical fiber needs to be connected to perform data transmission with outside. As a connecting structure between such optical module and an optical fiber, there is disclosed in non-patent literature 1 a structure, in which an optical connector made by uniting a 45-degrees mirror and an optical fiber is connected to a surface of an optical module having a lens installed on an optical element of a surface light emitting/receiving type.

In non-patent literature 2, as an optical connecting structure in which an optical waveguide having a silicon-based material such as silicon and silicon nitride as a waveguide core is connected to an optical module in a vertical direction, there is disclosed a structure in which a diffraction grating is formed in the side of the optical waveguide, and, in addition, an optical fiber is connected with the optical module to tilt about 10 degrees in order to reduce light which returns toward the opposite direction of the optical waveguide.

In non-patent literature 3, there is also disclosed a structure in which identically structured diffraction gratings having optic axes after conversion inclining from the vertical direction are connected to oppose each other and their optic axes being aligned.

CITATION LIST

Non Patent Literature

[NPL 1] Kazuhiko Kurata, Institute of Electronics, Information and Communication Engineers "Knowledge Base", group 9, edition 9, chapter 3, pp 5-17, February, 2011

[NPL 2] L. Zimmermann et al., IEEE LEOS NEWSLETTER, December, 2008 issue, pp 4-14

[NPL 3] S. Bernabe et al., Optics Express, vol. 20, No. 7, pp 7886-7894, March, 2012

SUMMARY OF INVENTION

Technical Problem

However, in all of the technologies described in non-patent literature 1-3, an end face of an optical fiber is made to oppose toward the side of an optical module, and light is inputted and outputted from the end face of the optical fiber. For this reason, an optical fiber needs to be arranged so that it extends in a direction perpendicular to the surface of an optical module or in a direction inclined to the surface of an optical module. However, under such circumstances, an optical fiber occupies the space around the optical module. Also, at the time of connecting an optical fiber to an optical module, it is necessary not only to adjust the optical fiber to a predetermined inclined angle relative to the optical module and maintain the inclined angle, those are difficult, but also to have a space for holding the optical fiber. An object of the present invention is to provide a connecting structure of an optical module and an optical connector which can, at the time of connecting the optical fiber and the optical module, make connecting work be carried out easily and certainly and can achieve space-saving.

Solution to Problem

In order to settle the above-mentioned problems, the present invention adopts the following means. That is, the present invention is a connecting structure of an optical module having a first optical waveguide formed along a surface of a substrate and an optical connector having a second optical waveguide optically coupled with the first optical waveguide and connected to the optical module mechanically, comprising: the optical module including a connecting face connected with the optical connector and a first diffraction grating, provided in an end part of the first optical waveguide, to convert an optical axis direction of the first optical waveguide to a direction toward an opposing face of the optical connector; in the optical connector, the second optical waveguide being provided in the optical connector along the opposing face toward the connecting face; the optical connector including a second diffraction grating, provided in an end part of the second optical waveguide, to convert an optical axis direction of the second optical waveguide into a direction toward the connecting face of the optical module; and while the optical module and the optical connector are connected mechanically to make the opposing face of the optical connector oppose the connecting face of the optical module, the first diffraction grating and the second diffraction grating opposing each other and being coupled optically.

Advantageous Effects of Invention

In the present invention, it is arranged such that a first diffraction grating and a second diffraction grating are made to oppose each other while the opposing face of an optical connector is made to oppose a connecting face of an optical module and the optical module and the optical connector are connected mechanically. As a result, a first optical waveguide of the optical module and a second optical waveguide of the optical connector are coupled optically via the first diffraction grating and the second diffraction grating. At that time, because the second diffraction grating and the second optical waveguide are provided in the optical connector, the optical connector needs only to be connected to the optical module, and thus connection work of them can be performed easily and certainly. Moreover, because the second optical waveguide is provided along the opposing face toward the connecting face in the optical connector, space-saving can be achieved.

DESCRIPTION OF EMBODIMENTS

Hereinafter, embodiments for implementing a connecting structure of an optical module and an optical connector according to the present invention will be described with reference to an accompanying drawing. However, the present invention is not limited to these exemplary embodiments.

(First Exemplary Embodiment)

Figure 1:
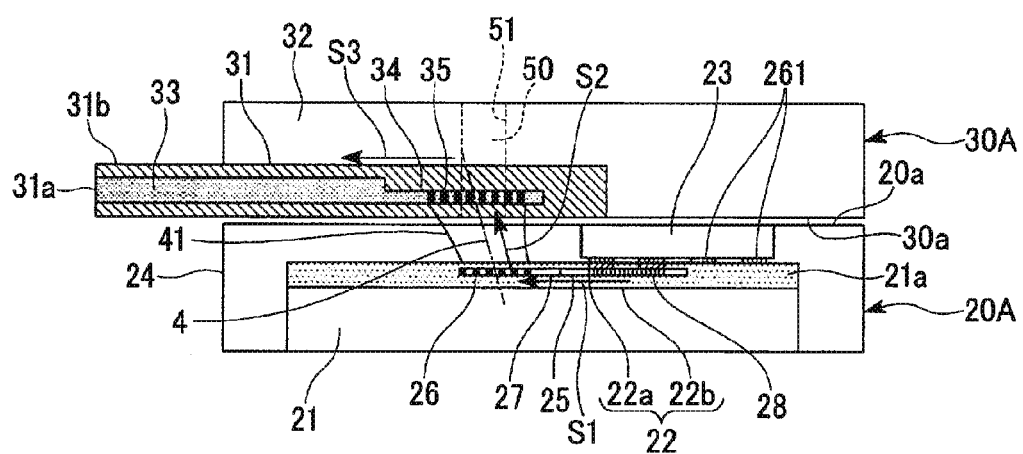
FIG. 1 is a sectional view showing a connecting structure of an optical module and an optical connector according to a first exemplary embodiment of the present invention.

FIG. 1 is a diagram showing a connecting structure of an optical module 20A and an optical connector 30A. As shown in this FIG. 1, the optical module 20A and the optical connector 30A are connected such that the connecting surface 20a formed onto one surface of the optical module 20A is opposed to the plate-like optical connectors 30A, and these can be mechanically detachably connected.

Figure 2A:
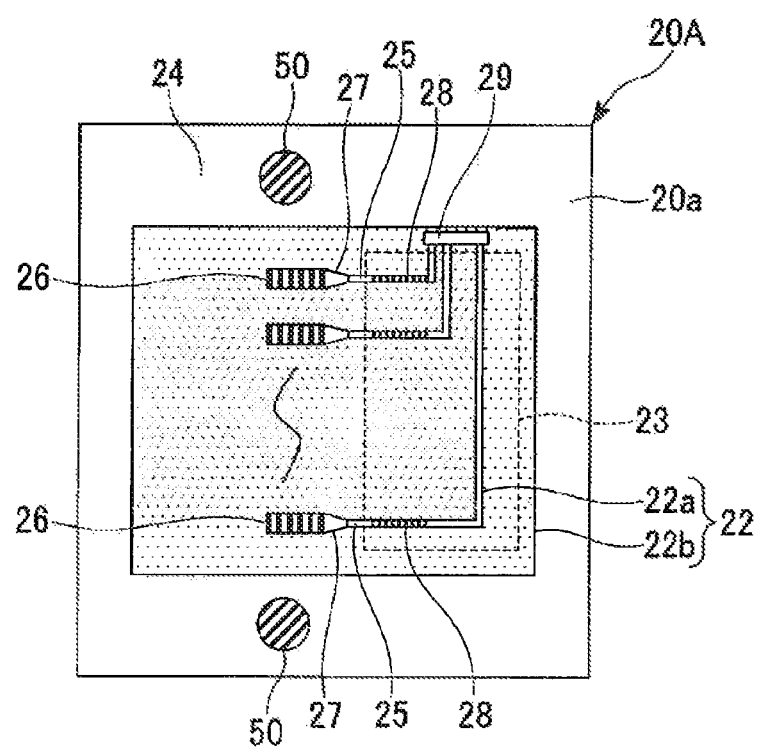
FIG. 2A is a cross-sectional plane view in a core layer of an optical waveguide of an optical module.

As shown in FIG. 1 and FIG. 2A, the optical module 20A has: a substrate 21 formed of silicon or the like; an optical waveguide (a first optical waveguide) 22 formed on the substrate 21; a driver IC (Integrated Circuit) 23; and a module mold 24 made of resin which covers the substrate 21, the optical waveguide 22 and the driver IC 23.

The substrate 21 may be formed using an SOI (Silicon on Insulator) substrate.

A core layer (a first core) 22a of the optical waveguide 22 is formed parallel to a surface 21a of the substrate 21. The core layer 22a is formed of silicon, for example, and is provided with an optical waveguide core 25 which continues in a line shape, a diffraction grating (a first diffraction grating) 26, a tapered waveguide core 27, an optical active element 28 and a light emitting device 29. This core layer 22a is covered with a cladding layer (a first cladding part) 22b made of silicon dioxide or the like.

The diffraction grating 26 is of a rectangular shape, for example, when seen in a plan view, and is provided in a tip part of the optical waveguide core 25. This diffraction grating 26 has a width larger than the width of the optical waveguide core 25. The diffraction grating 26 diffracts light having been propagated in a direction parallel to the surface 21a of the substrate 21 via the optical waveguide core 25 and the tapered waveguide core 27. By this, its optical axis direction is converted into a direction toward an opposing face 30a of the optical connector 30A, and light whose optical axis direction has been converted is emitted from the connecting face 20a.

The tapered waveguide core 27 is provided between the optical waveguide core 25 and the diffraction grating 26, and is formed so that a core width may gradually expand from the optical waveguide core 25 to the diffraction grating 26 in a tapered shape.

The optical active element 28 is provided in an intermediate portion of the optical waveguide core 25, the driver IC 23 is flip-chip mounted on this optical active element 28, and the optical active element 28 and the driver IC 23 are connected electrically via a connection bump 261 made of solder or the like.

The light emitting device 29 is arranged in an outer peripheral edge of the substrate 21, and the base end portion of the optical waveguide core 25 is connected to it.

Here, as shown in FIG. 2A, two or more optical waveguide cores 25 are provided as the optical waveguide 22 in an array shape, and respective optical waveguide cores 25 extend parallel to each other. The tapered waveguide core 27 and the diffraction grating 26 are arranged in parallel to a direction along the connecting face 20a of the optical module 20A, respectively. A plurality of such optical waveguide cores 25 are connected to the single light emitting device 29.

In the optical module 20A, there are formed two or more fitting pins (fitting portion) 50 projecting from the connecting face 20a in a direction perpendicular to the connecting face 20a. When the optical module 20A is seen from a direction perpendicular to the connecting face 20a, for example, this fitting pin 50 is arranged in the both sides of the substrate 21. The fitting pin 50 may be made to be of a tapered shape having an outside diameter reducing gradually as its tip part is approached, for example.

Figure 2B:
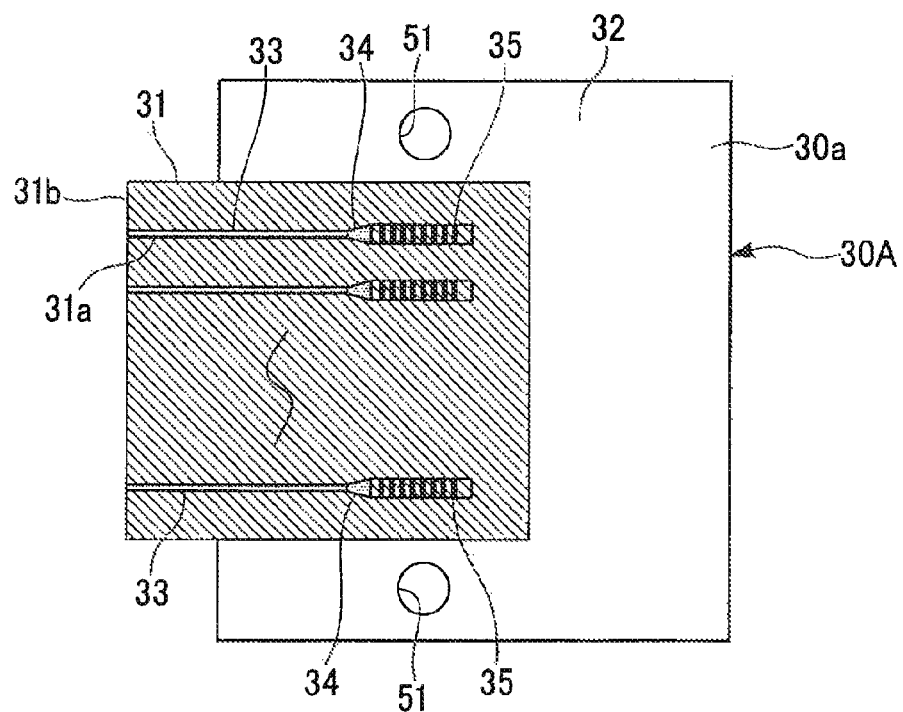
FIG. 2B is a cross-sectional plane view in a core layer of an optical waveguide of an optical connector.

As shown in FIG. 1 and FIG. 2B, the optical connector 30A includes an optical waveguide (a second optical waveguide) 31 provided continuously along the opposing face 30a in the side opposing the optical module 20A, and a connector mold 32 which covers the optical waveguide 31.

The optical waveguide 31 includes, in a core layer (a second core) 31a, an optical waveguide core 33 which continues in a line shape, a tapered waveguide core 34 and a diffraction grating (a second diffraction grating) 35. This core layer 31a is covered with a cladding layer (a second cladding part) 31b.

It is desirable to form the optical waveguide core 33 using a flexible waveguide having flexibility. It is also desirable for the optical waveguide 31 that the core layer 31a and a cladding layer 31b are formed using polymer materials having refractive indexes different from each other (the refractive index of the cladding layer 31b<the refractive index of the core layer 31a) or the like. The optical waveguide core 33 can also be formed using an optical fiber. However, by forming the optical waveguide core 33 and the cladding layer 31b by the polymer materials mentioned above, it becomes possible to design intervals between optical waveguide cores 33 relatively freely compared with an optical fiber, and to relax the fixed strength of the optical connector 30A because the optical waveguide core 33 and the cladding layer 31b can be bent freely. Meanwhile, it goes without saying that the optical connector 30A may be connected with an optical fiber.

The tapered waveguide core 34 is provided between the optical waveguide core 33 and the diffraction grating 35, and is formed such that its core width expands gradually from the optical waveguide core 33 toward the diffraction grating 35 in a tapered shape.

The diffraction grating 35 is of a rectangular shape, for example, when seen in a plan view, and is provided in the tip part of the optical waveguide core 33 via the tapered waveguide core 34. The diffraction grating 35 has a width size larger than the width of the optical waveguide core 33. However, the core diameter of the optical waveguide core 33 may be equal to or larger than the width of the diffraction grating 35. The diffraction grating 35 diffracts light entered from outside and converts its optical axis direction into a direction in which the tapered waveguide core 34 and the optical waveguide core 33 continue.

In the optical connector 30A, there is formed, in the opposing face 30*a* toward the connecting face 20*a* of the optical module 20A, a fitting hole (an fitted portion) 51 to which each piece of fitting pin 50 of the optical module 20A is inserted. When each piece of fitting pin 50 of the optical module 20A is fitted into each piece of fitting hole 51 of the optical connector 30A, the optical module 20A and the optical connector 30A are positioned with a predetermined positional relationship. As a result, the diffraction grating 26 in the side of the optical module 20A and the diffraction grating 35 in the side of the optical connector 30A oppose each other.

The diffraction grating 26 makes the optical axis of a optical signal which has propagated through the core layer 22*a* of the optical waveguide 22 be converted, and makes it diffracted light. The diffraction grating 35 has a function to couple diffracted light to the core layer 31*a* of the optical waveguide 31. Here, when the distance between the diffraction gratings 26 and 35 is large, the beam diameter becomes large, resulting in decrease of optical coupling efficiency. For this reason, it is desirable to make the diffraction gratings 26 and 35 have a light focusing function. As a result, diffracted light can be made to be collimated (parallel) light or focused light, and thus it is easy to couple optically between the diffraction gratings 26 and 35 even if the distance between them is large. Meanwhile, in the diffraction gratings 26 and 35, it is possible to select whether diffracted light is made to be collimated light or whether it is made to be focused light appropriately within a design range according to a refractive index difference between the core layer 22*a*, 31*a* and the cladding layer 22*b*, 31*b* of the optical waveguide 22, 31.

The shapes of the diffraction gratings 26 and 35 can be determined by a method such as a finite difference time domain (FDTD) method. According to the finite difference time domain method, which is a known method, a light path length changes by passage through the diffraction gratings 26 and 35, there occurs a difference in time of arrival of the light, and the shapes of the diffraction gratings 26 and 35 are determined by using this difference. If the pitch between the diffraction gratings 26 and 35 is adjusted, it is possible to tilt the optical axis of diffracted light (about 10 degrees, for example) in order to suppress influence of reflection, or to improve diffraction efficiency of a optical signal which has propagated through the core layers 22*a* and 31*a*. It is possible to make the diffraction gratings 26 and 35 have a light focusing function if a method to change a corrugation of a refractive index of a straight line-shape to the corrugation of a curve line-shape is used as indicated in non-patent literature 4.

Non-patent literature 4: T. Suhara et al., IEEE Journal of Quantum Electronics, vol. QE-22, No. 6, pp 845-867, June, 1986 (FIG. 23)

Figure 3:
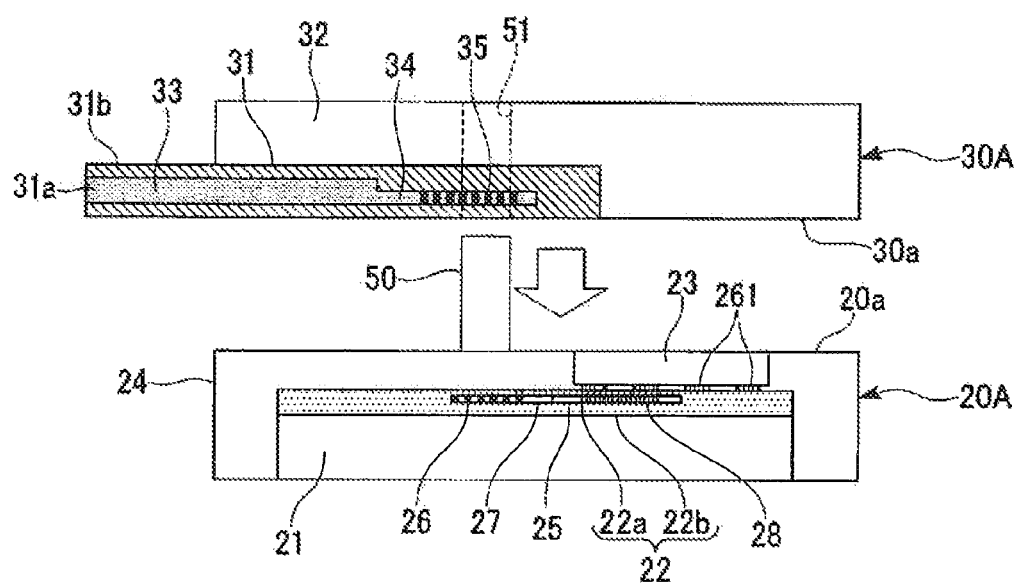
FIG. 3 is a sectional view showing a structure just before an optical module and an optical connector are connected.

As shown in FIG. 3, when the optical module 20A and the optical connector 30A are connected, these are brought close to each other along a direction almost perpendicular to the connecting face 20*a*, each piece of fitting pin 50 is inserted into each piece of fitting hole 51, and the connecting face 20*a* and the opposing face 30*a* come face-to-face with each other. As a result, as shown in FIG. 1, the optical module 20A and the optical connector 30A are connected mechanically at a position to make the diffraction grating 26 and the diffraction grating 35 oppose each other.

In this state, continuous light outputted from the light emitting device 29 of the optical module 20A propagates through the optical waveguide 22, and is modulated by the optical active element 28 according to an electric signal from the driver IC 23. The modulated light reaches the diffraction grating 26 as a optical signal S1 via the optical waveguide core 25 and the tapered waveguide core 27. In the diffraction grating 26, the optical axis direction of the optical signal S1 is converted, and it is outputted from the optical module 20A as an optical signal S2 within the range of an optical field 41 along an optical axis 4 which intersects with the connecting face 20*a* by a predetermined angle.

The optical signal S2 having been outputted from the optical module 20A reaches the diffraction grating 35 of the optical connector 30A, and its optical axis direction is converted and it becomes a optical signal S3. The optical signal S3 is outputted to outside via the tapered waveguide core 34 and the optical waveguide core 33 which form the optical waveguide 31.

In the structure mentioned above, the diffraction grating 26 is provided in the optical waveguide 22 of the optical module 20A, and, in addition, the diffraction grating 35 is provided in the optical waveguide 31 of the optical connector 30A, and the optical module 20A and the optical connector 30A are connected mechanically. As a result, diffraction gratings 26 and 35 are coupled optically while they oppose each other. By this, the optical axis direction of the optical signal S2 emitted from the optical module 20A via the diffraction grating 26 is converted in the diffraction grating 35 in the side of the optical connector 30A, and the converted optical signal will propagate through the optical waveguide 31 that continues in a direction along the opposing face 30*a* of the optical connector 30A. As a result, relative to the connecting face 20*a* of the optical module 20A, the optical waveguide 31 of the optical connector 30A can be drawn out toward a direction along the connecting face 20*a*. Accordingly, space-saving around the joint portion between the optical module 20A and the optical connector 30A can be achieved. In addition, because the optical waveguide 31 is incorporated in the optical connector 30A, it is possible to perform the work easily and certainly.

When the driver IC 23 is mounted on the optical waveguide 22 as is the case with the above exemplary embodiment, the diffraction gratings 26 and 35 are departed from each other at least by the thickness of the driver IC 23. However, when the diffraction gratings 26 and 35 have a light focusing function, it is possible to ensure optical coupling even if the distance between the diffraction grating 26 of the optical module 20A and the diffraction grating 35 of the optical connector 30A is large. Also, when this structure is used, the distance between the optical waveguide 22 of the optical module 20A and the optical waveguide 31 of the optical connector 30A can be made large. Therefore, it is possible to arrange the optical connector 30A above the optical module 20A that mounts not only the driver IC 23 but also the light emitting device 29 and other driver elements etc. on the substrate 21. As a result, it is possible to make design flexibility be improved and to suppress the area of a package made by putting the optical module 20A and the optical connector 30A together.

(Second Exemplary Embodiment)

Figure 4:
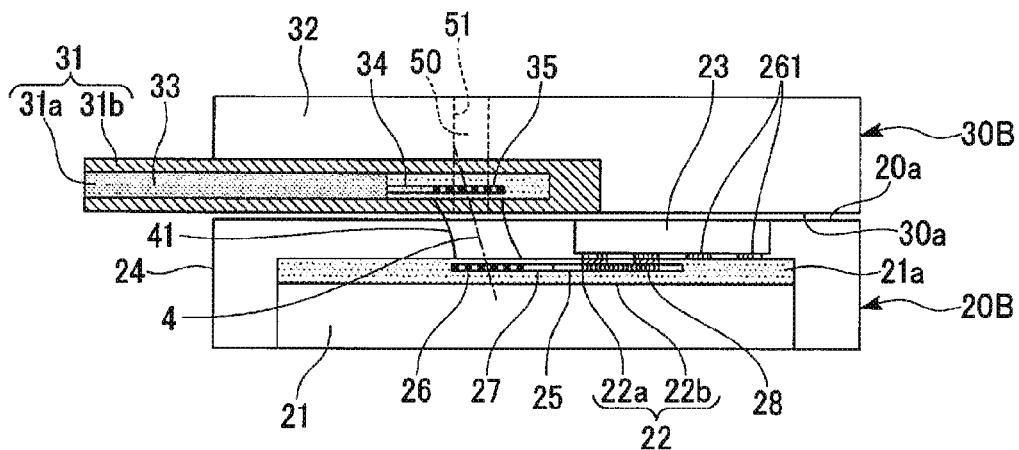
FIG. 4 is a sectional view showing a connecting structure of an optical module and an optical connector according to a second exemplary embodiment of the present invention.

Next, the second exemplary embodiment of the present invention will be described. In the second exemplary embodiment described below, a same code is attached to a structure common with the above-mentioned first exemplary embodiment in figures, and the description about it is omitted, and description will be made focusing on a difference with the first exemplary embodiment mentioned above. The structure shown in FIG. 4 is a connecting structure of an optical module 20B having an optical waveguide 22 and an optical connector 30B having an optical waveguide 31, and its overall structure is common to a structure indicated in the above-mentioned first exemplary embodiment.

In this exemplary embodiment, it is supposed that a refractive index structure (a refractive index ratio) between a diffraction grating 35 and a tapered waveguide core 34 of the core layer 31a of the optical connector 30B and a cladding layer 31b around them is identical with a refractive index structure (a refractive index ratio) between a diffraction grating 26 and the tapered waveguide core 27 of the optical module 20B and a cladding layer 22b around these. That is, in the optical connector 30B and the optical module 20B, the pairs of the diffraction grating 35 and the diffraction grating 26, the tapered waveguide core 34 and the tapered waveguide core 27, and the cladding layer 31b and the cladding layer 22b are formed of materials of same refractive indexes, respectively. Another kind of material may be adopted if it has a same refractive index with its counterpart, of course. However, formation using a same material is easier to do.

By making it such structure, in the optical waveguide 31 of the optical connector 30B and the optical waveguide 22 of the optical module 20B, there becomes no influence of refraction at a boundary surface of each of the portions caused by a difference in refractive index differences. As a result, it is easy to design.

(Third Exemplary Embodiment)

Figure 5:
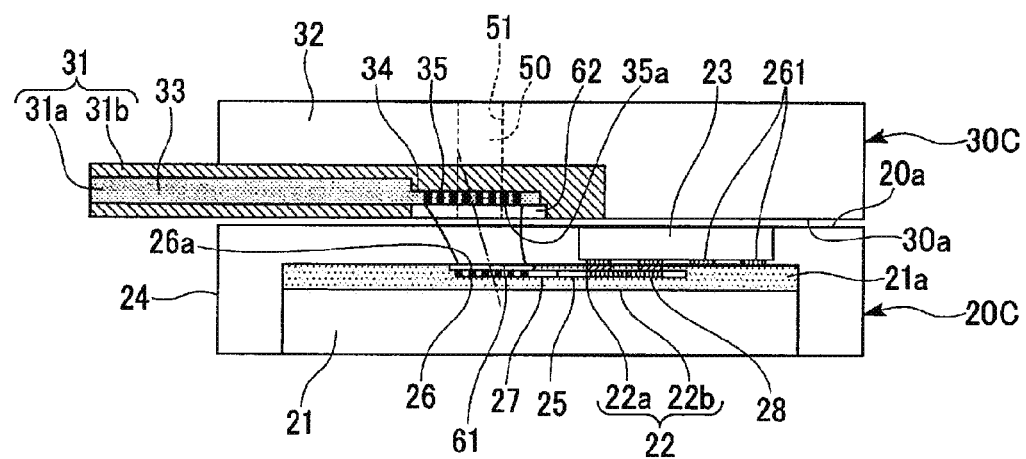
FIG. 5 is a sectional view showing a connecting structure of an optical module and an optical connector according to a third exemplary embodiment of the present invention.

Next, the third exemplary embodiment of the present invention will be described. In the third exemplary embodiment described below, a same code is attached to a structure common with the above-mentioned first exemplary embodiment in figures and description about it is omitted, and description will be made focusing on a difference with the above-mentioned first exemplary embodiment. The structure shown in FIG. 5 is a connecting structure of an optical module 20C having an optical waveguide 22 and an optical connector 30C having an optical waveguide 31, and its overall structure is common to the structure indicated in the first exemplary embodiment mentioned above.

In this exemplary embodiment, in an area of a optical-signal emission surface 26a in the diffraction grating 26 of the optical module 20C and an area of a optical-signal incident surface 35a in the diffraction grating 35 of the optical connector 30C, the areas being opposite each other, the cladding layers 22b and 31b are cut away and a gap (a first concave part) 61 and a gap (a second concave part) 62 which make the emission surface 26a and the incident surface 35a of the diffraction gratings 26 and 35 be exposed are formed.

If the above structure is used, the refractive index of an air (=1.0) which fills the gaps 61 and 62 is smaller than the refractive index of silicon dioxide (=1.44) forming the cladding layers 22b and 31b. Specifically, because of this, in the optical waveguides 22 and 31, a difference in refractive indexes in a boundary surface of the emission surface 26a and the incident surface 35a of the diffraction gratings 26 and 35 formed of silicon (refractive index: 3.5) becomes large. More specifically, while the ratio of the refractive indexes of silicon and silicon dioxide is 3.5:1.44, the ratio of the refractive indexes of silicon and an air is 3.5:1.0. Meanwhile, the above refractive indexes are indicated as refractive indexes at a wavelength of 1550 nm, as an example. As a result, compared with a structure in which areas opposing each of the optical-signal emission surface 26a in the diffraction grating 26 of the optical module 20C and the optical-signal incident surface 35a in the diffraction grating 35 of the optical connector 30C are covered with the cladding layers 22b and 31b like the first exemplary embodiment mentioned above, the diffraction gratings 26 and 35 can be small. Moreover, there becomes no influence of refraction at a boundary surface in each portion caused by a difference in refractive index differences of the optical module 20C and the optical connector 30C by filling an air in the gaps 61 and 62 as a same material. As a result, it is easy to design.

(Fourth Exemplary Embodiment)

Figure 6:
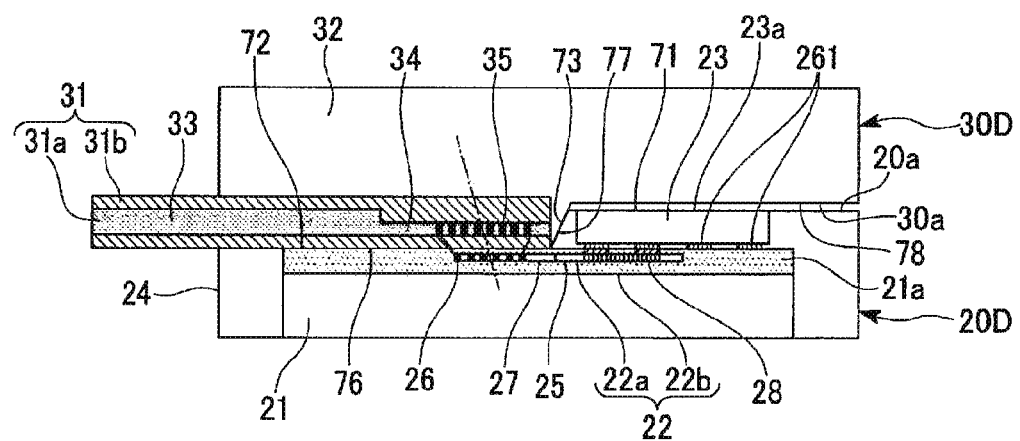
FIG. 6 is a sectional view showing a connecting structure of an optical module and an optical connector according to a fourth exemplary embodiment of the present invention.

Next, the fourth exemplary embodiment of the present invention will be described. In the fourth exemplary embodiment described below, a same code is attached to a structure common with the first exemplary embodiment mentioned above in figures and description about it is omitted, and explanation will be made focusing on a difference with the above first exemplary embodiment. The structure shown in FIG. 6 is a connecting structure of an optical module 20D having an optical waveguide 22 and an optical connector 30D having an optical waveguide 31, and its overall structure is common to the structure indicated in the first exemplary embodiment mentioned above.

In this exemplary embodiment, the connecting face 20a of the optical module 20D includes a convex part surface 71 along a surface 23a of a driver IC 23, a recessed part surface 72 at the same height as a cladding layer 22b of the optical waveguide 22 and a step part 73 formed between the convex part surface 71 and the recessed part surface 72. On the other hand, the optical connector 30D has: a convex part surface 76 at the same height as a cladding layer 31b of the optical waveguide 31 and that opposes the recessed part surface 72; and a recessed part surface 78 that is formed via the convex part surface 76 and a step part 77 and that opposes the convex part surface 71.

If such structure is used, the recessed part surface 72 and the convex part surface 76 oppose each other while the optical module 20D and the optical connector 30D are connected, and, therefore, the diffraction gratings 26 and 35 are coupled optically while they are close to each other compared with the structure of the third exemplary embodiment mentioned above. As a result, influence of scattering of light between the diffraction gratings 26 and 35 can be suppressed. Because the diffraction grating 26 and 35 are close to each other and are coupled optically, a tolerance of optical coupling is loose between the diffraction gratings 26 and 35. As a result, optical coupling is allowed even if the mutual position accuracy is poor in the vertical direction at the connection between the optical module 20D and the optical connector 30D.

Meanwhile, in the above fourth exemplary embodiment, it has been made such that the optical connector 30D has a structure in which it has the convex part surface 76 and the recessed part surface 78. However, it may be of a shape and a size without the recessed part surface 78 and the step part 77 if the diffraction grating 35 is arranged in a position opposing the recessed part surface 72 of the optical module 20D.

(Other Exemplary Embodiments)

Meanwhile, a connecting structure between an optical module and an optical connector of the present invention is not limited to each of the above-mentioned exemplary embodiments described with reference to the drawings, and various modifications can be considered within its technical scope. For example, in the above-mentioned first to fourth exemplary embodiments, it has been described that it is desirable to employ, as the diffraction gratings 26 and 35, ones having a light focusing function. However, scattering of light may be suppressed using a structure in which, instead of employing diffraction gratings having a light focusing function as the diffraction gratings 26 and 35, a diffraction grating having a light focusing function is arranged between the diffraction grating 26 and the diffraction grating 35. In this case, however, there is a possibility that a structure and manufacturing processes become complicated and a diffraction grating having a light focusing function that has been additionally installed will be located on the surface of an optical module or an optical connector, resulting in getting a scar and dust easily and causing a poor yield. In contrast, if ones having a light focusing function are employed as the diffraction gratings 26 and 35 as indicated in each of the above-mentioned exemplary embodiments, occurrence of such problem can be avoided.

For example, about the first to fourth above-mentioned exemplary embodiments, a case in which light is emitted from the optical modules 20A-20D and enters the optical connectors 30A-30D has been described. However, it is similar for a case in which light is emitted from the optical connectors 30A-30D, and enters the optical modules 20A-20D.

Also, the fitting pin 50 and the fitting hole 51 have been used in order to couple the optical modules 20A-20D and the optical connectors 30A-30D mechanically. However, other structures such as ones having an engaging pawl and an engaging recess with which this engaging pawl is engaged may be used if the optical modules 20A-20D and the optical connector 30A-30D can be coupled mechanically. The structures described in the above-mentioned first to fourth exemplary embodiments can be combined appropriately. Other than that, the structures mentioned in the above-mentioned exemplary embodiments can be selected or changed to other structures accordingly unless it deviates from the main points of the present invention.

This application claims priority based on Japanese Application Japanese Patent Application No. 2012-191647 filed on Aug. 31, 2012, the disclosure of which is incorporated herein in its entirety.

INDUSTRIAL APPLICABILITY

The present invention can be applied to various kinds of equipment which perform data transmission using a optical signal, for example. In the present invention, when an optical fiber and an optical module are connected, it is possible to perform the work easily and certainly, and achieve space-saving.

REFERENCE SIGNS LIST

4 Optic axis
20A-20D Optical module
30A-30D Optical connector
20a Connecting face
21 Substrate
21a Surface
22 Optical waveguide (first optical waveguide)
22a Core layer (first core)
22b Cladding layer (first cladding part)
23 Driver IC (element).
23a Surface
24 Module mold
25 Optical waveguide core
26 Diffraction grating (first diffraction grating)
26a Emission surface
27 Tapered waveguide core
28 Optical active element
29 Light emitting device
30a Opposing face
31 Optical waveguide (second optical waveguide)
31a Core layer (second core)
31b Cladding layer (second cladding part)
32 Connector mold
33 Optical waveguide core
34 Tapered waveguide core
35 Diffraction grating (second diffraction grating)
35a Incident surface
41 Optical field
50 Fitting pin (fitting portion)
51 Fitting hole (fitted portion)
61 Gap (first concave part)
62 Gap (second concave part)
71 Convex part surface
72 Recessed part surface
73 Step part
76 Convex part surface
77 Step part
78 Recessed part surface

What is claimed is:

1. A connecting structure comprising:
an optical module that has a first optical waveguide formed along a surface of a substrate, a connecting face connected said an optical connector and a first diffraction grating, provided in an end part of said first optical waveguide, to convert an optical axis direction of said first optical waveguide to a direction toward an opposing face of an optical connector;
said optical connector that has a second optical waveguide coupled with said first optical waveguide optically and connected to said optical module mechanically, said second optical waveguide being provided in said optical connector along said opposing face facing said connecting face; and has a second diffraction grating, provided in an end part of said second optical waveguide, to convert an optical axis direction of said second optical waveguide into a direction toward said connecting face of said optical module;
and said first diffraction grating and said second diffraction grating being coupled optically facing each other in a state connecting said optical module and said optical connector mechanically in a manner making said opposing face of said optical connector face said connecting face of said optical module and said first diffraction grating and said second diffraction grating being coupled optically in a state that an optical axis inclines from a line which perpendicularly connects said corresponding face of the light module and said optical connector.

2. The connecting structure of an optical module and an optical connector according to claim 1, wherein at least one of said first diffraction grating and said second diffraction grating has a light focusing function of light input ted to and outputted from said connecting face or said opposing face.

3. The connecting structure of an optical module and an optical connector according to claim 1,
wherein a ratio of a refractive index of a first core and said first diffraction grating of said first optical waveguide to a refractive index of a first cladding part provided around said first core and said first diffraction grating is set equal to a ratio of a refractive index of a second core and said second diffraction grating of said second optical waveguide to a refractive index of a second cladding part provided around said second core and said second diffraction grating.

4. The connecting structure of an optical module and an optical connector according to claim 1,
wherein said optical module has a first concave part to make a surface of said first diffraction grating be exposed, and wherein said optical connector has a second concave part to make a surface of said second diffraction grating be exposed.

5. The connecting structure of an optical module and an optical connector according to claim 1,
wherein said optical module includes a device mounted on said substrate or on said first optical waveguide in a side of connecting said optical connector,
and said optical module includes a convex part formed in a manner covering said device and said optical connector includes a recessed part in a place facing said convex part so as to take in a height of said convex part.

6. The connecting structure of an optical module and an optical connector according to claim 1,
wherein said optical module has an engagement part to engage with said optical connector, and said optical connector has an engaged part to be engaged with said engagement part.

7. An optical device including said connecting structure of claim 1 comprising:
at least one light emitting device optically connected to a plurality of first optical waveguide on said optical module,
a plurality of optical active element optically connected to said first optical waveguides and said first diffraction gratings,
an driver device that drives said optical active elements,
a plurality of second optical waveguide formed on said optical connector,
a first fitting portion on said first optical waveguide,
a second fitting portion on said first optical connector fits in said first fitting portion.

8. The connecting structure of an optical module and an optical connector according to claim 1,
wherein said first optical waveguide and said second optical waveguide are made in different materials.

* * * * *